No. 859,045. PATENTED JULY 2, 1907.
B. F. BURKE.
WEED GUARD FOR FISH HOOKS.
APPLICATION FILED APR. 30, 1907.

Benjamin F. Burke,
Inventor

Witnesses
C. E. Smith.
Geo. E. Tew

By M. B. Stimson
Attorneys

UNITED STATES PATENT OFFICE.

BENJAMIN F. BURKE, OF CHICAGO, ILLINOIS, ASSIGNOR OF ONE-HALF TO MATTHEW CORBETT, OF CHICAGO, ILLINOIS.

WEED-GUARD FOR FISH-HOOKS.

No. 859,045.  Specification of Letters Patent.  Patented July 2, 1907.

Application filed April 30, 1907. Serial No. 371,121.

*To all whom it may concern:*

Be it known that I, BENJAMIN F. BURKE, a citizen of the United States, residing at Chicago, in the county of Cook and State of Illinois, have invented certain new and useful Improvements in Weed-Guards for Fish-Hooks, of which the following is a specification.

This invention relates to weed guards for fish hooks, and has for its object to provide an improved guard which is attached to the hook in such manner that it can be used or not, as desired. When fishing among weeds, it can be put in place over the point of the hook, and when used in open water the guard can be drawn down or back onto the shank of the hook so as to lie closely along the same and not interfere with the ordinary use of the hook.

The invention is illustrated in the accompanying drawings, in which

Figure 1:
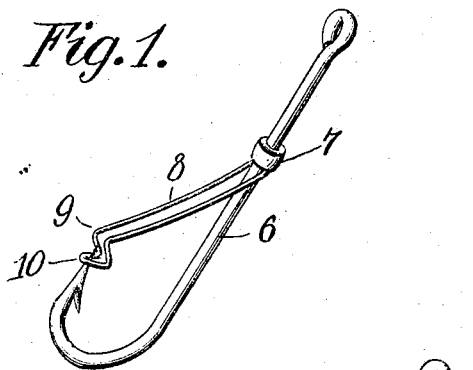
Figure 2:
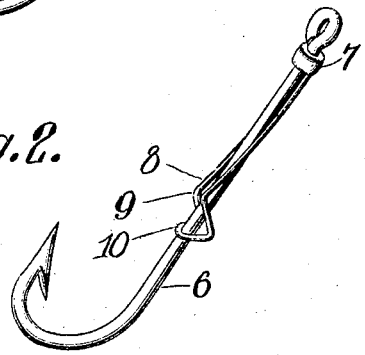
Figure 3:
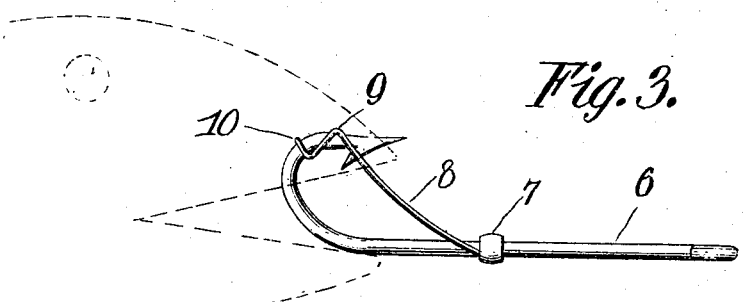

Figure 1 is a perspective view of the hook with the guard in operative position. Fig. 2 is a perspective view with the guard withdrawn or out of action. Fig. 3 is a side elevation illustrating the manner in which the guard may slip or yield when a fish strikes the hook.

Referring specifically to the drawings, 6 indicates an ordinary fish hook. The weed guard consists of a short cuff or collar 7 which is loose and slidable up and down on the shank of the hook and has a spring guard wire 8 fixed thereto. This guard is formed in a loop, made of fine wire and fixed at its ends to the collar 7 and offset at its lower end as indicated at 9 to project beyond the point of the hook, and then bowed as at 10 to catch over the point, as illustrated.

The wire guard 8 is so attached to the coller 7 that it tends to spring into parallelism with the shank of the hook, and if its loop 10 be disengaged from the point of the hook it will seek or assume the position shown in Fig. 2, lying closely alongside the shank. It is held in operative position by its own resiliency, and is fixed to protect the point of the hook by being sprung out and engaged thereover. The spring action or quality will bind the bend or loop 10 against the point of the hook and also bind the collar upon the shank of the hook, so that the guard will remain in place against any ordinary pressure, such as that of contact with weeds or grass in the water. When struck by a fish, the backward pull or jerk of the fish will cause the guard to slip down or back, uncovering the point of the hook, and as soon as the bend 10 of the spring passes the point of greatest rise or curvature of the neck of the hook the spring action of the guard will cause it to snap down over the lower end of the hook, entirely out of the way. This action is very quickly performed, the sudden impact of the lip of the fish against the guard serving in most instances to snap the guard out of position and cause it to spring or slide down out of the way of the point and other parts of the hook. This action is illustrated in Fig. 3. Or in some instances the strike may cause the guard to slip up, or be knocked off sidewise, instead of down, and thus uncover the point of the hook. In any event the guard, being loosely mounted on the shank of the hook, and being held in place by its own spring action, may be readily dislodged by a sudden stroke or effort, without being dislodged by the gradual or gentle contact of weeds or grasses in the water. In clear water, the guard is simply allowed to rest or hang beside the shank. The bulk of the bait will keep it out of the way of the hook point, and it does not interfere with the ordinary use of the hook. It can be set by springing the wire to bear at the bend 10 against the point of the hook, and will hold its position under ordinary circumstances or conditions, as above stated.

I claim:

1. A fish hook having a weed guard comprising a collar loose on the shank of the hook and a spring wire loop connected at its ends to the collar and engageable over the point of the hook and slidable either up or down to uncover the point of the hook.

2. A fish hook having a weed guard comprising a collar slidable on the shank of the hook, and a spring wire loop connected to the collar and tending to assume a position parallel to the shank of the hook, and adapted to be sprung over the point of the hook and retain its position thereon by its own elasticity, the collar being movable in either direction on the shank, with respect to the point of the hook, so that the loop will slip either up or down, to uncover the point of the hook.

3. A fish hook having a weed guard comprising a slide on the shank of the hook, and a spring wire loop connected to the slide, and offset at its lower end to project beyond the point of the hook and bowed to engage over the point of the hook on the outer side thereof, the collar and loop being slidable either up or down to uncover the point of the hook.

In testimony whereof I affix my signature, in presence of two witnesses.

BENJAMIN F. BURKE.

Witnesses:
 NELLIE FELTSKOG,
 H. G. BATCHELOR.